United States Patent [19]
Hall et al.

[11] Patent Number: 5,832,233
[45] Date of Patent: Nov. 3, 1998

[54] NETWORK COUPLER FOR ASSEMBLING DATA FRAMES INTO DATAGRAMS USING INTERMEDIATE-SIZED DATA PARCELS

[75] Inventors: Trevor Hall, Derbyshire; Brian Higgins, Manchester, both of England; Iain Bruce Robertson, Edinburgh, Scotland

[73] Assignee: International Computers Limited, London, United Kingdom

[21] Appl. No.: 671,162

[22] Filed: Jun. 28, 1996

[30] Foreign Application Priority Data

Aug. 16, 1995 [GB] United Kingdom ............... 9516777

[51] Int. Cl.$^6$ .............. G06F 13/38; G06F 15/17
[52] U.S. Cl. .................. 395/200.66; 370/476
[58] Field of Search ............... 395/200, 200.66, 395/200.64, 200.62; 370/60, 354, 359, 398, 473, 476

[56] References Cited

U.S. PATENT DOCUMENTS 4,922,487  5/1990  Ellenberger ............... 370/60
4,926,416  5/1990  Weik ............... 370/354

FOREIGN PATENT DOCUMENTS

0441787B1  7/1994  European Pat. Off. .
4127244A1  8/1991  Germany .
4130318A1  9/1991  Germany .

OTHER PUBLICATIONS

Kieran Taylor; "From Frames to Cells: Low–Speed Access to ATM"; Data Communications May 1995, pp. 47–50.

Primary Examiner—Mark H. Rinehart
Attorney, Agent, or Firm—Lee, Mann, Smith, McWilliams, Sweeney & Ohlson

[57] ABSTRACT

A data processing element comprises at least one processor, a main memory, and a network coupler for coupling the processing element to a network. The network coupler includes a packing circuit for assembling the data frames into intermediate units of data, referred to as parcels, and a network coupler processor for assembling the parcels into datagrams in the main memory. Thus, the packing circuit relieves the network coupler processor of a substantial amount of low-level processing work.

8 Claims, 4 Drawing Sheets

NETWORK COUPLER FOR ASSEMBLING DATA FRAMES INTO DATAGRAMS USING INTERMEDIATE-SIZED DATA PARCELS

BACKGROUND TO THE INVENTION

This invention relates to a network coupler, and more specifically is concerned with a network coupler for use in a multi-processor computer system.

One problem that arises in such a system is that of assembling data frames received from the network into datagrams. This can require considerable processing power, and may require a sophisticated processor to be dedicated to this task.

The object of the present invention is to alleviate this problem of data assembly.

SUMMARY OF THE INVENTION

According to the invention there is provided a data processing element comprising at least one processor, a main memory, and a network coupler for coupling the processing element to a network, wherein said network coupler comprises:

(a) means for receiving a succession of data frames from said network;

(b) a parcel memory;

(c) a packing circuit for assembling said data frames into parcels in said parcel memory; and (d) a network coupler processor for assembling said parcels from said parcel memory into datagrams in said main memory.

It will be seen that, in order to facilitate the assembly of frames into datagrams, the invention employs an intermediate unit of data, referred to herein as a parcel, comprising a plurality of frames. Assembly of frames into parcels is controlled by the packing circuit, while assembly of parcels into datagrams is controlled by the network coupler processor. Thus, the packing circuit relieves the network coupler processor of a substantial amount of low-level processing work, allowing a less powerful processor to be used than would otherwise be the case, or allowing the processor to perform other functions.

DESCRIPTION OF AN EMBODIMENT OF THE INVENTION

One embodiment of the invention will now be described by way of example with reference to the accompanying drawings.

Overview of the system

Figure 1:
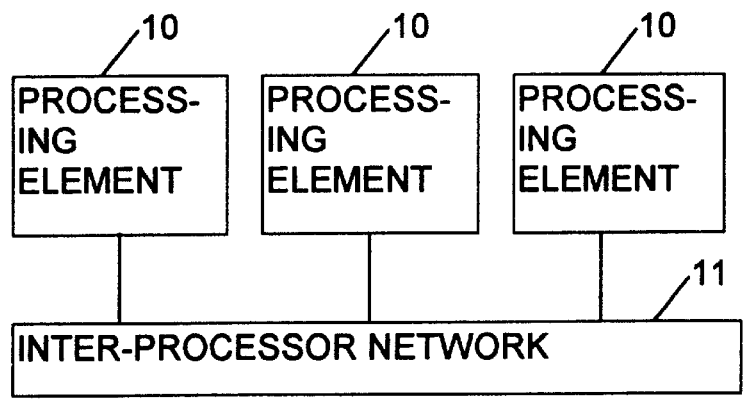
FIG. 1 is a block diagram of a multi-processor computer system embodying the invention.

FIG. 1 shows a computer system comprising a plurality of processing elements (PEs) 10, interconnected by an inter-processor network 11. The network 11 comprises a multi-stage packet switching network, which allows any of the PEs to send data to any other PE.

Data is transmitted from one PE to another in the form of datagrams, each of which can be up to 8 megabytes in length. However, because of the packet-based nature of the network, it is necessary to split the data into frames (or packets) for transmission over the network. In other words, it is necessary for the source PE to disassemble each datagram into a succession of frames for transmission, and for the destination PE to assemble the received frames into datagrams. In the present example, each frame is of variable length, with a maximum frame length of 128 bytes and a minimum frame length of 16 bytes.

In order to facilitate the assembly of frames into datagrams, the system also employs an intermediate unit of data, referred to herein as a parcel, comprising a plurality of frames. In the present example, the maximum permitted parcel size is 8 kilobytes (i.e. 64 frames, if the frame size is 128 bytes).

All interfaces/busses employ parity generation and checking. Each transmitted frame has a 2-byte CRC (cyclic redundancy code) tagged on to the end of it, for checking the integrity of the frame.

Frame header

Each frame has a 16-byte header, including the following fields:

Datagram ID (8 bits). The datagram identity.

FinP (6 bits). A frame in parcel sequence count, i.e. the position of this frame within the current parcel. The first frame in each parcel has FinP=0.

PinD (10 bits). A parcel in datagram sequence count, i.e. the position of the parcel within the datagram. The first parcel in each datagram has PinD=0.

NumFinP (6 bits). The total number of frames in the current parcel, minus 1.

NumPinD (10 bits). The total number of parcels in the datagram, minus 1.

Source address (8 bits). The identity of the source PE that sent the datagram.

Destination address (8 bits). The identity of the destination PE to which the datagram is being sent.

Frame length (8 bits). The number of bytes in the frame.

Frame type. This identifies the frame as being part of a message datagram, or as being a control datagram, such as an explicit ACK (acknowledgement) or NACK (non-acknowledgement).

Processing element

Figure 2:
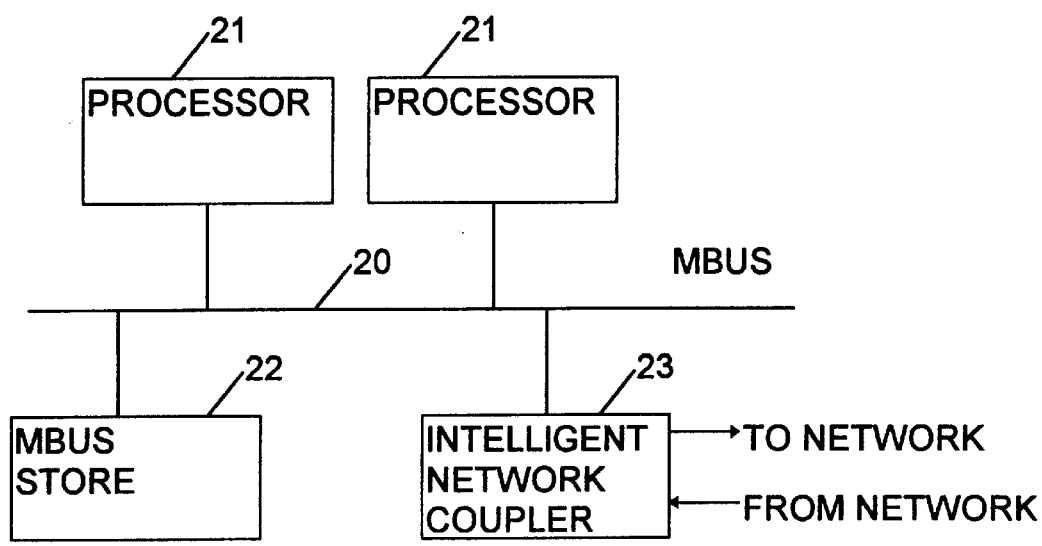
FIG. 2 is a block diagram showing one of the processing elements in the system in more detail.

FIG. 2 shows one of the PEs in more detail. The PE comprises a bus 20, referred to herein as the MBUS. Connected to the MBUS are two processors 21, a main memory 22 (referred to herein as the MBUS store), and an intelligent network coupler (INC) 23.

Intelligent network coupler (INC)

Figure 3:
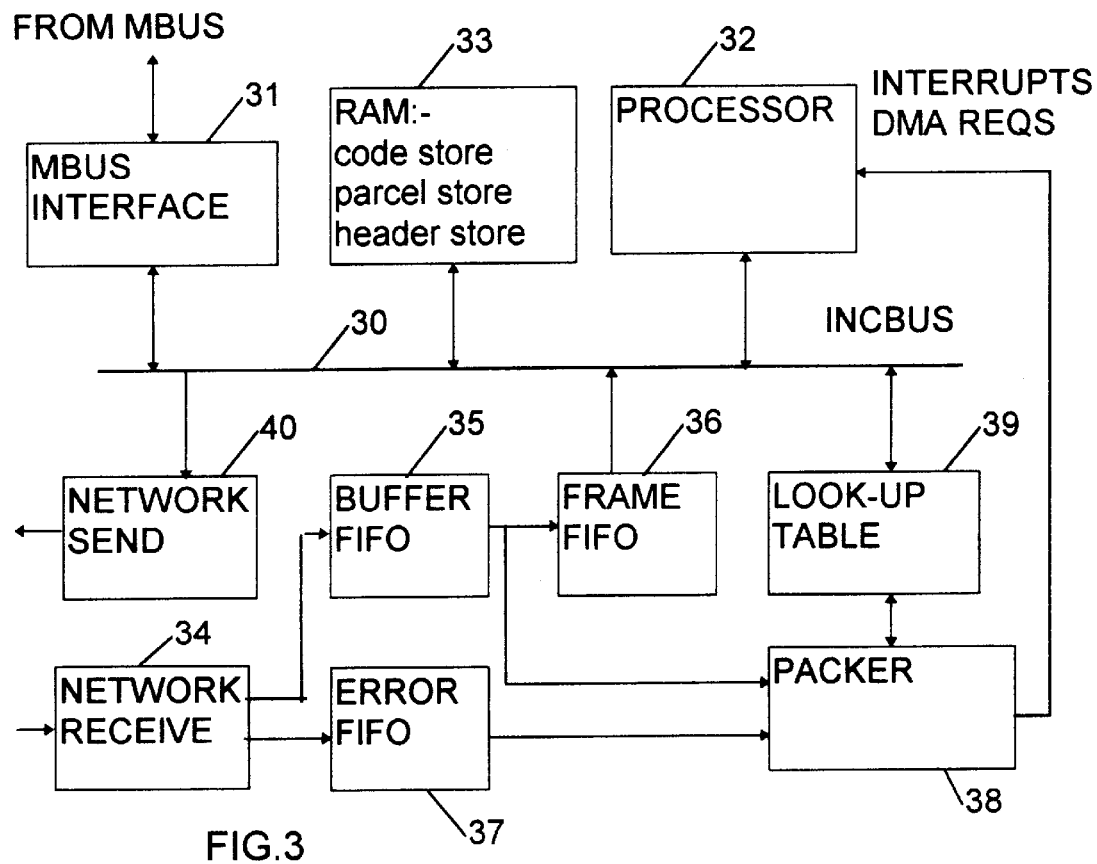
FIG. 3 is a block diagram showing an intelligent network coupler (INC) in more detail.

FIG. 3 shows the INC in more detail. The INC comprises a bus 30 (referred to as the INCBUS), an MBUS interface circuit 31, a processor 32 (referred to as the INC processor), a random access memory (RAM) 33, a network receiver circuit 34, a buffer first-in-first-out memory (FIFO) 35, a frame FIFO 36, an error FIFO 37, a packer circuit 38, a look-up table 39, and a transmitter circuit 40.

The MBUS interface circuit 31 provides an interface between the MBUS and the INCBUS, allowing the INC processor 32 to perform direct memory access (DMA) operations on the main store 22.

The RAM 33 includes a code store, a parcel store, and a header store. The code store holds programs for the INC processor. The parcel store is used, as will be described, for assembling received frames into parcels. The header store holds header information relevant to each parcel being assembled.

The network receiver circuit 34 receives data frames from the inter-processor network, and places the frames in the buffer FIFO. The receiver circuit includes handshake logic for interfacing with the network and also includes frame error detection logic for checking the frame length, destination address, and CRC bits of each frame.

The buffer FIFO 35 is a byte-wide FIFO, holding 4 kilobytes, and acts as a buffer between the network and the INC.

The frame FIFO 36 is a word-wide single-frame FIFO which is used as temporary storage for a frame, prior to it being written into the parcel store.

The error FIFO 37 is an 11-bit-wide FIFO. Each time the receiver circuit places a frame in the buffer FIFO, it also writes a status code into the error FIFO, indicating whether or not any frame errors have been detected. Thus, if the error FIFO is non-empty, this indicates that a frame is available in the buffer FIFO. The error FIFO also holds the actual frame length (as opposed to the length specified by the frame header) of each frame in the frame FIFO.

The packer circuit 38 takes the frames in the frame FIFO and assembles them into parcels in the parcel store. It also performs sequence checking, to check the sequence of frames within parcels and the sequence of parcels within datagrams. The packer circuit interrupts the INC processor when it detects the start of a new datagram, the end of a parcel or datagram, or an error. Each interrupt has an interrupt vector associated with it, indicating the network source address of the parcel or datagram in question.

The packer is implemented as a programmable logic device, such as a field programmable gate array (FPGA) or a complex programmable logic device (CPLD). The packer is described in more detail below.

As will be described in more detail below, the INC processor assembles the parcels in the parcel store into datagrams in the MBUS memory. However, the INC processor handles control datagrams (such as explicit ACK and NACK datagrams) locally, without placing them in the MBUS memory.

The look-up table 39 is used by the packer to keep track of the parcels currently being assembled in the parcel store. It is also used by the INC processor to keep track of parcels being assembled into datagrams in the MBUS store. In order to minimize access times, the look-up table is implemented as a dual-port RAM, accessible both by the packer and by the INC processor. Locking/arbitration mechanisms are not required for this dual-port RAM, since the packer and the INC processor will never attempt to access the same location in the look-up table simultaneously. The contents of the look-up table, and the way in which the table is used, are described in more detail below.

The transmitter circuit 40 handles transmission of datagrams to the network. It accesses the MBUS store, using DMA read operations, so as to read a datagram. It splits the datagram up into parcels and frames, and adds the appropriate headers to each frame. The frames are held in a buffer, and then sent in sequence over the network.

Parcel store and header store.

Figure 4:
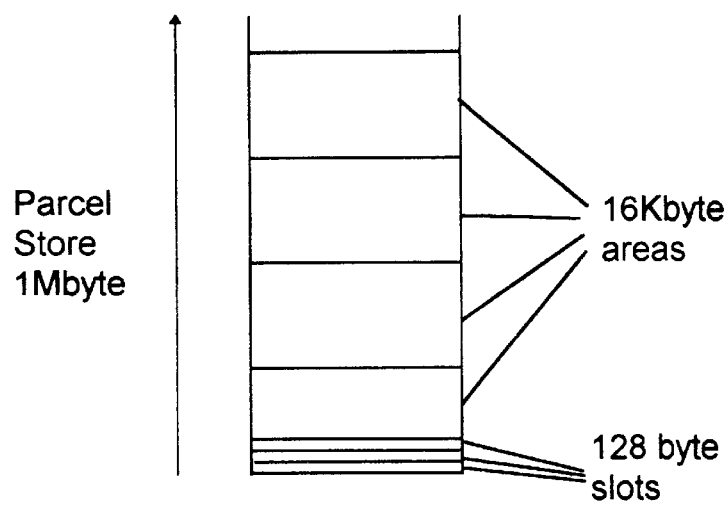
FIG. 4 is a schematic diagram showing the way in which data is organised in a parcel store by the INC.

FIG. 4 shows the way in which data is organised in the parcel store. The parcel store comprises 64 areas, each 16 kilobytes in size. (Hence, the overall size of the parcel store is 1 megabyte). Each PE attached to the network is allocated one of these 16 kilobyte areas. Each area is subdivided into 128 slots, each containing 128 bytes.

In use, each slot holds a maximum of one frame, regardless of the frame size. Successive frames of a multi-frame parcel received from a source PE are written into contiguous slots of the area allocated to that source PE. This eases the DMA transfer of the parcel into the MBUS store.

The header store is organised in a similar manner, except that each slot in the header store holds just a single parcel header. Because sequence checking is performed in the packer, only one header per parcel needs to be stored.

The parcel store and header store addresses are formed by concatenating the following, in order of decreasing bit significance:

Base address. This value is fixed at system initialisation, and points to the base of the RAM area to be used as the parcel/header store.
Network source address, i.e. the identity of the source PE.
Slot pointer. This is derived from the look-up table.
Word address.

Look-up table

The look-up table contains 64 entries: one entry for each area of the parcel store. Each entry occupies two successive word locations in the dual-port RAM, and comprises the following fields:

Slot pointer (7 bits). A pointer to the next free slot in the area.
Ring count (7 bits). A count of the number of occupied slots in the area. This count is incremented by the packer when it writes to a slot, and decremented by the INC processor when it reads the contents of a slot.
Parcel start address (7 bits). The slot address at which a parcel starts.
Error status (8 bits). Error information. This includes a "discard" bit which, when set to 1, indicates that the network source has suffered a frame sequence error, and that as a result all frames associated with the current datagram are to be discarded.
Datagram ID (8 bits). The identifier of the current datagram.
NextFinP (6 bits). The expected FinP of the next frame.
NextPinD (10 bits). The expected PinD of the next frame.

Packer

Figure 5A:
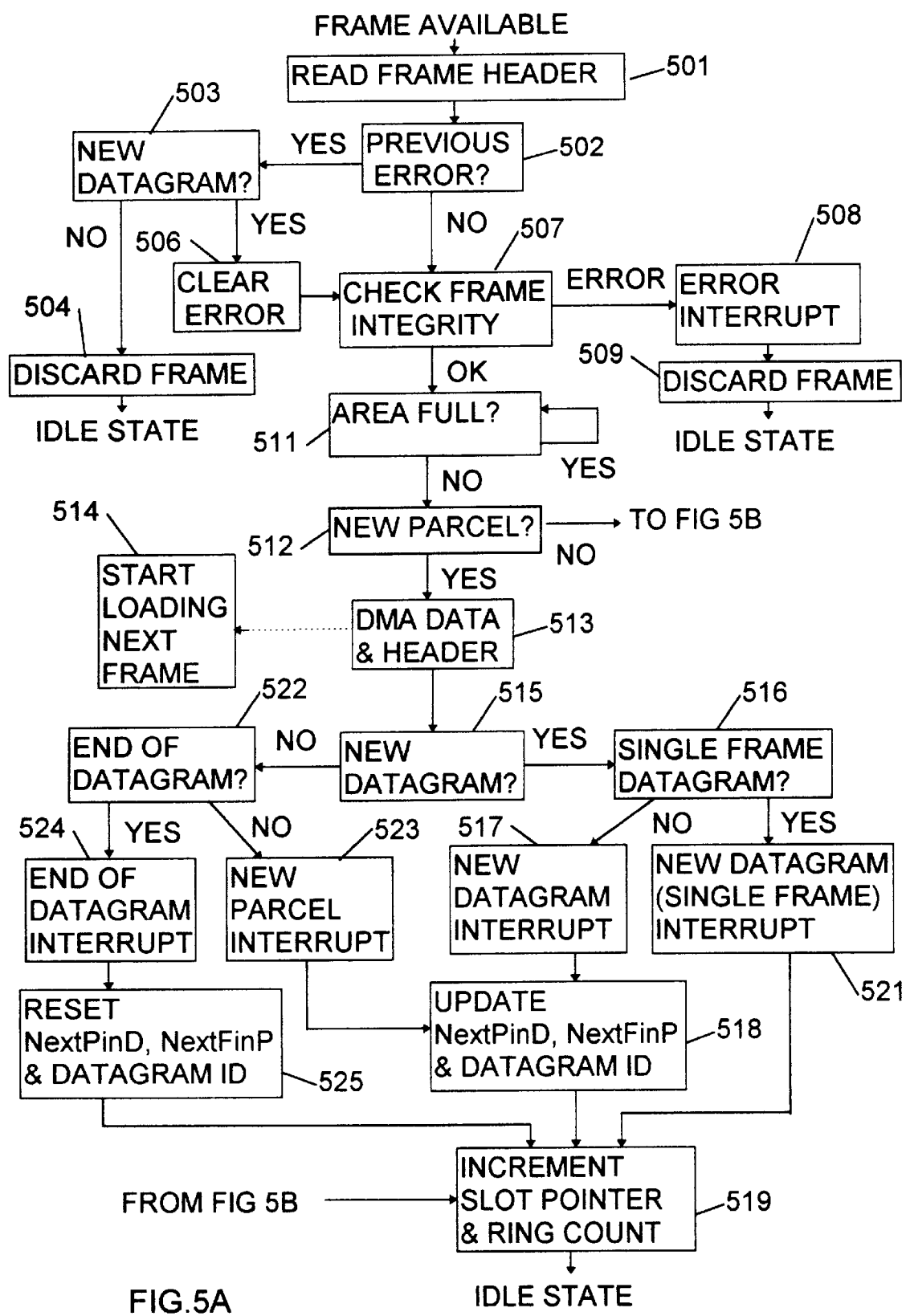
FIG. 5A and 5B is a flowchart showing the operation of a packer circuit within the INC.

The packer will now be described in detail, with reference to FIG. 5.

(Step 501) When the packer detects that a frame is available in the buffer FIFO, it reads the frame header into its internal registers. At the same time it reads the frame error status from the error FIFO. The packer then proceeds to step 502.

(Step 502) The packer accesses the look-up table entry for the source PE, and checks the "discard" bit in the error status field of that entry, to determine whether this source has suffered a sequence error. If the "discard" bit is set, indicating a previous error, the packer proceeds to step 503; otherwise it proceeds to step 507.

(Step 503) The packer checks whether the frame is the first frame in a new datagram. This is indicated by the values FinP and PinD in the frame header both being 0. If this is the first frame in a new datagram, the packer proceeds to step 506; otherwise it proceeds to step 504.

(Step 504) The frame is discarded. The packer then enters an idle state, waiting for the next frame; when the next frame becomes available, the packer will resume operation from step 501.

(Step 506) The packer resets the "discard" bit in the error status field in the look-up table, to clear the error condition, and then proceeds to step 507.

(Step 507) The packer checks the frame error status received from the error FIFO. The packer also checks the frame sequencing, by comparing the FinP, PinD and Datagram ID fields of the frame header with the NextFinP, NextPinD and Datagram ID fields respectively of the look-up table entry. If these checks reveal any frame errors or sequencing errors, the packer proceeds to step 508; otherwise it proceeds to step 511.

(Step 508) The packer updates the error status field in the look-up table to record the detected errors and sets the "discard" bit to ensure that subsequent frames of this datagram will be discarded. The packer then generates an "Error" interrupt, along with an interrupt vector containing information identifying the error. The frame is discarded (step 509). The packer then enters an idle state, waiting for the next frame; when the next frame becomes available, the packer will resume operation from step 501.

(Step 511) The packer accesses the ring count field of the look-up table entry. If the value of this field equals 63, this indicates that the area of the parcel store allocated to this source is currently full, and so the packer simply waits in a loop. The packer remains in this loop until the INC processor reads from this area of the parcel store, and decrements the ring count. The packer then proceeds to step 512.

Figure 5B:
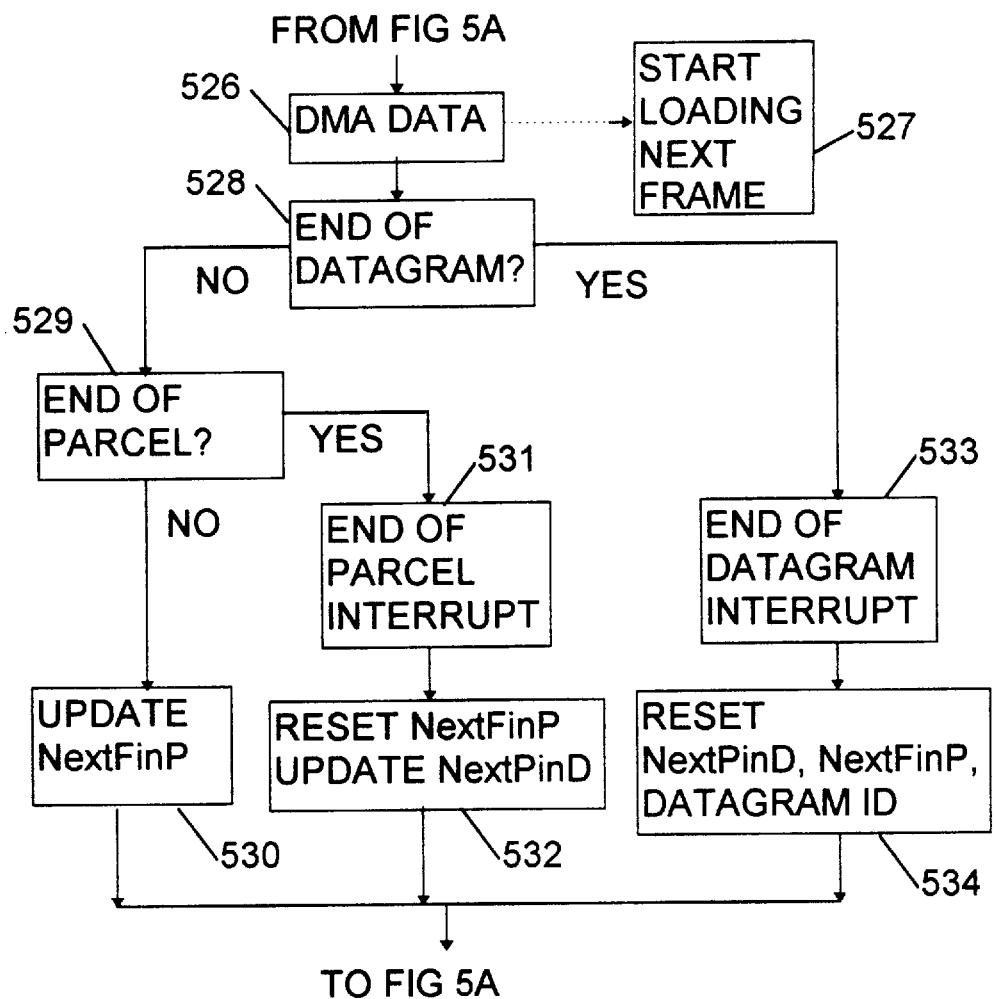

(Step 512) The packer determines whether this is the first frame of a new parcel (i.e. whether the FinP field in the frame header is equal to 0). If this is the first frame of a new parcel, the packer proceeds to step 513; otherwise it proceeds to step 526 (FIG. 5B).

(Step 513) The packer sends a DMA request to the INC processor, requesting it to set up DMA transfers to read the frame from the frame FIFO into the parcel store, and also to read the frame header into the header store. At the same time, the packer initiates reading of the next frame into the frame FIFO (step 514), so that the reading of the next frame will proceed in parallel with the DMA transfer of the current frame. The packer then proceeds to step 515.

(Step 515) The packer checks whether this is the first frame of a new datagram (i.e. whether the PinD field in the frame header is equal to 0). If this is the first frame of a new datagram, the packer proceeds to step 516; otherwise it proceeds to step 522.

(Step 516) The packer then checks whether this is a single frame datagram (i.e. whether the NumFinP field in the frame header equals 0). If this is a single frame datagram, the packer proceeds to step 521; otherwise it proceeds to step 517.

(Step 517) The packer generates a "New Datagram" interrupt for the INC processor, to inform it that a new datagram has been detected, along with an interrupt vector. The packer then (step 518) updates the NextPinD and NextFinP fields of the look-up table entry respectively with PinD+1 and FinP+1 (i.e. the values of the PinD and FinP fields from the frame header, incremented by one). It also writes the Datagram ID field from the frame header into the Datagram ID field of the look-up table. Finally (step 519), the packer increments both the slot pointer and ring pointer fields of the look-up table. The packer then enters an idle state, waiting for the next frame; when the next frame becomes available, the packer will resume operation from step 501.

(Step 521) The packer generates a "New Datagram" interrupt for the INC processor, along with an interrupt vector indicating that this is a single frame datagram. The packer then proceeds directly to step 519.

(Step 522) The packer checks whether this is the last frame of the current datagram (i.e. whether the NumPinD and PinD fields of the frame are equal). If this is the last frame of the datagram, the packer proceeds to step 524; otherwise it proceeds to step 523.

(Step 523) The packer generates a "New Parcel" interrupt along with an interrupt vector. It then proceeds to step 518.

(Step 524) The packer generates an "End of Datagram" interrupt along with an interrupt vector. It then (step 525) updates the look-up table, by resetting the NextPinD, NextFinP and Datagram ID fields to zero, before proceeding to step 519.

(Step 526) The packer sends a DMA request to the INC processor, requesting it to set up a DMA transfer to read the frame from the frame FIFO into the parcel store. At the same time (step 527), the packer initiates reading of the next frame into the frame FIFO, so that the reading of the next frame will proceed in parallel with the DMA transfer of the current frame. The packer then proceeds to step 528.

(Step 528) The packer checks whether this is the last frame of the current datagram. If this is the last frame of the datagram the packer proceeds to step 533; otherwise it proceeds to step 529.

(Step 529) The packer checks whether this is the last frame of the current parcel (i.e. whether the header fields FinP and NumFinP are equal). If this is the last frame of the parcel, the packer proceeds to step 531; otherwise it proceeds to step 530.

(Step 530) The packer updates the NextFinP field of the look-up table with FinP+1. It then proceeds to step 519.

(Step 531) The packer generates an "End of Parcel" interrupt along with an interrupt vector. It then (step 532) updates the look-up table by resetting the NextFinP to 0 and by setting the NextPinD field to PinD+1. It then proceeds to step 519.

(Step 533) The packer generates an "End of Datagram" interrupt along with an interrupt vector. It then (step 534) updates the look-up table, by resetting the NextPinD, NextFinP and Datagram ID fields to zero, before proceeding to step 519.

For example, it can be seen that, in normal error-free operation, the packer performs the following sequences of steps, depending on the kind of frame received.

First frame of a multi-frame datagram: steps 501, 502, 507, and 511–519.

Last frame of a datagram: steps 501, 502, 507, 511, 512, 526–528, 533 and 534.

First frame of parcel (but not first frame of datagram): steps 501, 502, 507, 511–515, 522, 523, 518, and 519.

Last frame of parcel (but not last frame of datagram): steps 501, 502, 507, 511, 512, 526–529, 531 and 532.

Intermediate frame (i.e. neither the first or last frame of a datagram or parcel): steps 501, 502, 507, 511, 512, and 526–530.

Operation of the INC processor

When the INC processor receives a "New Datagram" interrupt, it accesses the parcel header in the header store, to check whether the datagram is destined for the MBUS store, or is a control datagram (e.g. an explicit ACK or NACK) which is to be processed locally. If the datagram is destined for the MBUS store, the INC processor interrupts the processor 21, requesting it to allocate a buffer in the MBUS store, ready to receive the new datagram. If the datagram is a single-frame datagram, the INC processor also performs the actions as for an "End of Datagram" interrupt, as described below.

When an "End of Parcel" interrupt is received, the INC processor accesses the parcel header in the header store, and validates the parcel-in-datagram and datagram-in-service sequence numbers. If the parcel is found to be correct, and is not a control datagram, a DMA transfer is set up, to read the parcel from the parcel store, and to write it into the allocated buffer in the MBUS store. The INC processor also accesses the look-up table entry corresponding to the source PE, and decrements the ring count field by the number of frames in the parcel.

When an "End of Datagram" interrupt is received, the INC processor first checks whether the datagram is destined for the MBUS store. If so, it performs the actions as described above for an "End of Parcel" interrupt, so as to transfer the last parcel of the datagram to the buffer, and then sends a message to the PE, indicating that reception of the datagram is complete. If the datagram is indicated as "reliable", it generates an ACK for returning to the sender.

If, on the other hand, the received datagram is a control datagram (e.g. an explicit ACK or NACK), it is processed locally by the INC processor, without being placed in the buffer.

When an "Error" interrupt is received, the INC processor initiates a recovery attempt, by sending a retry message to the sender. In the meantime, as described above, the packer will discard any further frames in the offending datagram. Some possible modifications It will be appreciated that many modifications may be made to the system described above without departing from the scope of the present invention. For example, the sizes of the frames, parcels and datagrams may be varied.

We claim:

1. A data processing element comprising at least one processor, a main memory, and a network coupler for coupling the processing element to a network, wherein said network coupler comprises:

(a) means for receiving a succession of data frames from said network;
    (b) a parcel memory;
    (c) a packing circuit for assembling said data frames from said network into parcels in said parcel memory; and
    (d) a network coupler processor for reading said parcels from said parcel memory and assembling said parcels from said parcel memory into datagrams in said main memory.

2. A processing element according to claim 1 wherein said packing circuit comprises a programmable logic device.

3. A processing element according to claim 1 wherein said datagrams include control datagrams and message datagrams, and wherein said network coupler processor includes means for processing said control datagrams locally, without passing said control datagrams to the main memory.

4. A processing element according to claim 1 wherein said packing circuit includes means for using direct memory access (DMA) operations to write frames into said parcel memory.

5. A processing element according to claim 1 wherein said packing circuit includes means for checking correct sequencing of frames within a parcel and of parcels within a datagram.

6. A processing element according to claim 5 wherein said packing circuit includes means for discarding subsequent frames in a datagram following detection of a sequencing error.

7. A processing element according to claim 1 further including look-up table for containing sequence control information relating to said frames and parcels, said look-up table being stored in a dual-port memory accessible both by said packing circuit and said network coupler processor.

8. A multi-processor computer system comprising a plurality of data processing elements, and a network interconnecting said processing elements, each said data processing element comprising at least one processor, a main memory, and a network coupler for coupling the processing element to said network, wherein said network coupler comprises:

(a) means for disassembling a datagram into a plurality of data parcels, each of said data parcels comprising a plurality of data frames, and for transmitting said data frames over said network;
    (b) means for receiving input data frames from said network;
    (c) a parcel memory;
    (d) a packing circuit for assembling said input data frames from said network into data parcels in said parcel memory; and
    (e) a network coupler processor for reading said data parcels from said parcel memory and assembling said data parcels from said parcel memory into datagrams in said main memory.

* * * * *